United States Patent [19]
Klein

[11] Patent Number: 5,330,642
[45] Date of Patent: Jul. 19, 1994

[54] METHOD OF FILTERING CELLULOSE ACETATE SOLUTIONS AS WELL AS A PLANT FOR CARRYING OUT THE METHOD

[75] Inventor: Walter Klein, Lenzing, Austria

[73] Assignee: Lenzing Aktiengesellschaft, Lenzing, Austria

[21] Appl. No.: 849,196

[22] Filed: Mar. 11, 1992

[30] Foreign Application Priority Data

Mar. 14, 1991 [AU] Australia ................ A577/91

[51] Int. Cl.⁵ ............ B01D 29/62; B01D 29/66; B01D 29/80
[52] U.S. Cl. .................. 210/194; 210/196; 210/202; 210/205; 210/411; 210/333.01; 210/333.1; 210/770; 210/771; 210/791; 210/805; 536/76; 536/77; 536/127; 536/128
[58] Field of Search ........... 210/411, 108, 333.01, 210/333.1, 393, 805, 791, 793, 771, 770, 769, 196, 194, 202, 205; 536/76, 77, 127, 128

[56] References Cited

U.S. PATENT DOCUMENTS

| | | | |
|---|---|---|---|
| 2,925,367 | 2/1960 | Soelberg | 210/411 |
| 3,705,648 | 12/1972 | Arvanitakis | 210/108 |
| 3,852,191 | 12/1974 | Zucker | 210/411 |
| 3,907,686 | 9/1975 | Fletcher | 210/411 |
| 3,911,938 | 10/1975 | Wiltrout | 210/108 |
| 4,029,114 | 6/1977 | Wiltrout | 210/108 |
| 4,202,768 | 5/1980 | DeLonge | 210/411 |
| 4,306,060 | 12/1981 | Ikemoto | 536/76 |
| 4,352,739 | 10/1982 | Oliver | 210/333.1 |
| 4,415,734 | 11/1983 | Yabune | 536/76 |
| 4,619,770 | 10/1986 | Boston | 210/805 |
| 4,818,420 | 4/1989 | Mims | 210/411 |
| 4,954,268 | 9/1990 | Just | 210/411 |
| 5,013,432 | 5/1991 | Martinez-Mugica | 210/411 |
| 5,043,071 | 8/1991 | Anselme | 210/411 |
| 5,055,207 | 10/1991 | Spaller | 210/805 |

Primary Examiner—Thomas M. Lithgow
Attorney, Agent, or Firm—Ostrolenk, Faber, Gerb & Soffen

[57] ABSTRACT

Apparatus for filtering cellulose acetate solutions, including a backflush filter to effect filtration so as to avoid solvent losses and filtering aids that must be dumped, dilution means including solvent supply means for diluting the backflush liquid, separation means for eliminating solid insoluble components, and means for recycling backflush liquid freed from solids to a plant for producing new cellulose acetate spin solution.

4 Claims, 1 Drawing Sheet

METHOD OF FILTERING CELLULOSE ACETATE SOLUTIONS AS WELL AS A PLANT FOR CARRYING OUT THE METHOD

BACKGROUND OF THE INVENTION

The invention relates to a method of filtering cellulose acetate solutions as well as to a plant for carrying out the method.

When producing acetate rayon (artificial silk), it is necessary to carefully filter the highly viscous cellulose acetate solution so as to obtain favorable fiber properties. It has been known to carry out the filtration by means of filter presses (Ullmanns Encyklopädie der technischen Chemie, 3rd Editlion, Vol. 3, pp.17 to 20). Such filter presses must be supplied with various filtering aids—such as, e.g., filter cloths of cellulose or fabric, or other precoating means.

In a continuous production process, these filter presses will be clogged after a few days at the latest, and the filtering aids or precoating means will have to be disposed of.

Filter presses are regenerated by being opened and supplied with new filtering aids. This results in a substantial loss of cellulose acetate, which may be reduced by washing the filters with solvent. All of these manipulations must be carried out in a "solvent atmosphere". Since acetone is used as the solvent, the wearing of gas masks becomes indispensible, and there is a constant danger of explosion.

SUMMARY OF THE INVENTION

The invention aims at avoiding these disadvantages and difficulties and has as its object to provide a method and a plant for carrying out this method, in which filtration is feasible over a long period and without interruption, in particular without the necessity of taking apart the filtering device. Furthermore, the cellulose acetate solution is to be completely utilizable, possibly without any loss, and waste accrued by the filtration process is to be disposed of in a simple and inexpensive manner.

According to the invention, this object is achieved in that filtering is carried out by backflushing, wherein the backflushing liquid consisting of filtrate (called reject), is, in a closed system, diluted, subsequently subjected to separation for eliminating solid, insoluble components, and finally returned to the process as a solvent. A particular additional advantage of this method consists in that accruing of soiled filtering aids does not occur. Furthermore, product losses are substantially reduced, and regeneration of filter presses in "solvent atmosphere" is avoided. Simultaneously, quality improvement of the end products is achieved due to an improved purification.

A substantial feature of the invention is the separation carried out between dilution of the backflush liquid and the returning of the backflush liquid that has been freed from solids into the cellulose acetate production process.

Suitably, the backflushing liquid is continuously diluted.

For large production amounts it is advantageous to carry out dilution according to the batch-method or in several steps.

Advantageously, the solids are removed in sludge form after separation.

It is particularly advantageous if the solid, insoluble components are dried after separation and dumped, wherein suitably solvent accrued during drying is returned to the closed system. This ensures a harmless dumping of the waste materials.

A plant for carrying out the method according to the invention with a filter station provided in a cellulose acetate duct is characterised in that the filter station comprises at least one backflush filter whose backflush duct enters into a dilution station together with a solvent supply duct, that a duct guiding the diluted backflush liquid to a separator departs from the dilution station, and that the backflush liquid freed from solids is supplied from the separator to the cellulose acetate production process via a duct. The solid materials are removed in sludge form, and the backflush liquid freed therefrom is removed at the upper end of the separator.

Suitably, a drying station is arranged to follow the separator after separation of the sludge for drying the separated solid, insoluble components, from which the solvent, e.g. acetone, is recovered by evaporation and supplied to the cellulose production process.

According to a preferred embodiment, the dilution station comprises several containers connected in parallel and individually connectable to the backflush duct.

A further suitable embodiment is characterised in that the dilution station comprises a plurality of consecutively arranged containers.

BRIEF DESCRIPTION OF THE DRAWINGS

The invention will now be explained in more detail by way of two exemplary embodiments and with reference to the drawing, wherein.

DESCRIPTION OF THE PREFERRED EMBODIMENTS

Figure 2:
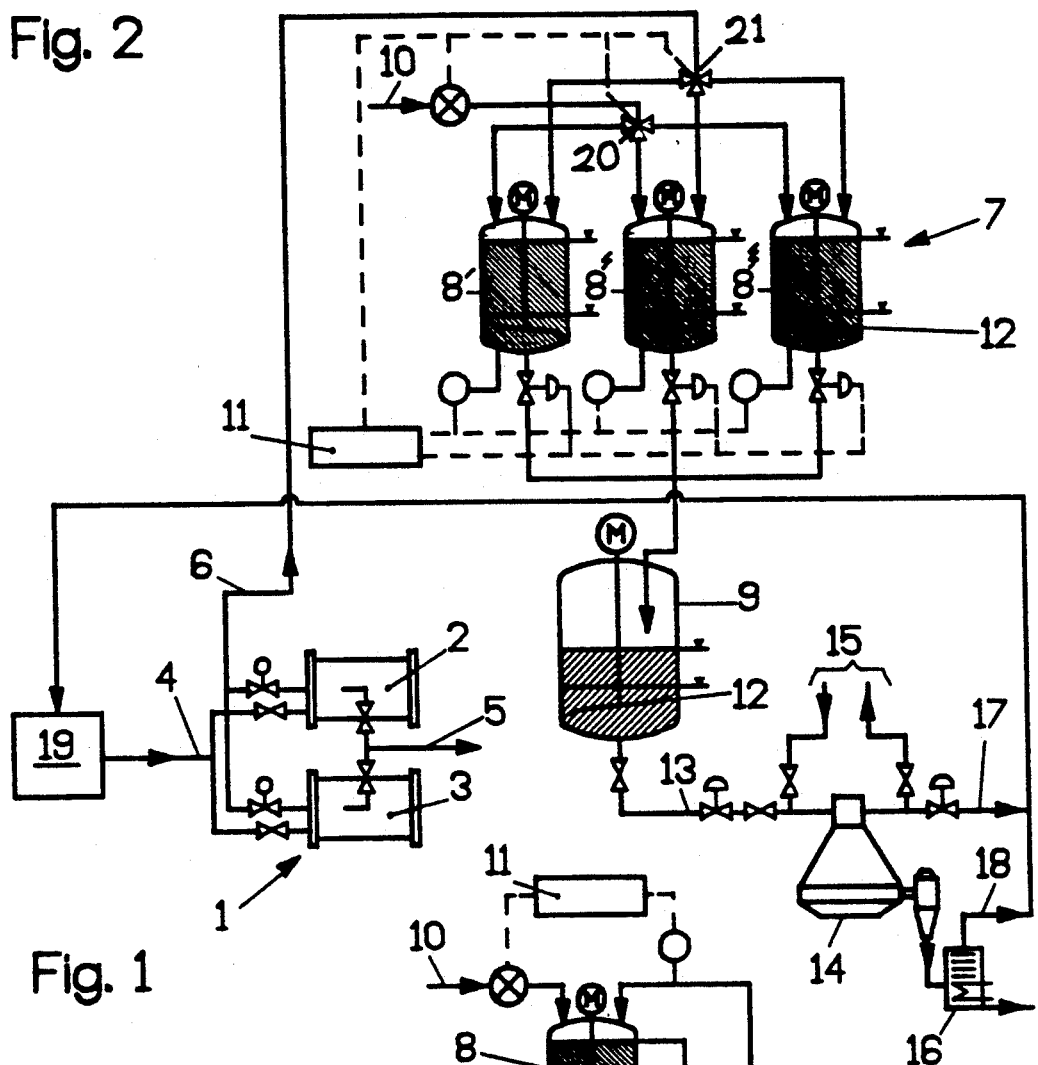
FIG. 2 shows it according to a second embodiment, each being a schematical illustration.
Figure 1:
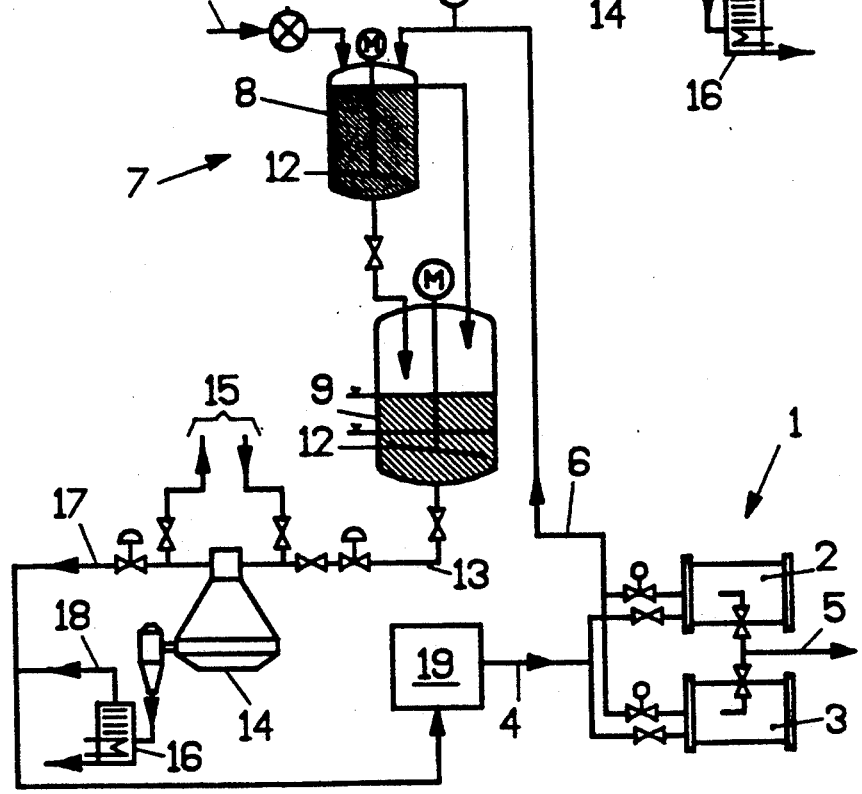
FIG. 1 shows a plant according to the invention according to a first embodiment.

In a plant for producing artificial silk, a filter station 1 is provided for filtering cellulose acetate solutions and comprises two backflush filter apparatuses 2, 3 connected in parallel. The backflush filter apparatuses suitably are of that type which forms the subject matter of Austrian Patent No. 377 709. The solution to be filtered is supplied from the solutizing shop via duct 4, and the filtrate is conducted away via duct 5, e. g. to the spinning station.

The backflush liquid formed by the solvent for the cellulose acetate, such as acetone, reaches the dilution station 7 via a backflush duct 6, which dilution station comprises a preparation tank 8 and a consecutively arranged recipient tank 9. Into the preparation tank there enters a solvent supply duct 10, via which solvent, whose supplied amount is dosed by means of a multiplier control 11 at a ratio of approximately 1:4, is supplied to dilute the backflush liquid. Both, the preparation tank 8 and the recipient tank 9 are equipped with stirrers 12, each drivable by a motor M.

The diluted backflush liquid is supplied via a duct 13 departing from the recipient tank 9 to a separator 14 equipped with a closed coil circuit 15, which eliminates the solid, insoluble components contained in the backflush liquid in a known manner, such as, e.g., by centrifuging. The eliminated components are dried in a drier 16 arranged to follow the separator 14 and may subsequently be transported to a dump.

Via ducts 17, 18, both, the backflush liquid separated by the separator 14 and the solvent incurred in the drier 16 are supplied to be reused as solvents in a plant 19 for producing new spin solutions.

As becomes apparent from the above description, the filtration method according to the invention is a completely closed circulation system, in which no solvent is liberated and in which no solvent losses occur, and thus the method is not harmful to the environment and is economical. Furthermore, filtering aids that need be dumped do not accrue, and the method may practically be carried out continuously, without any down-time caused by the system.

According to the embodiment illustrated in FIG. 2, dilution is carried out according to the "batch-running method". To this end, a plurality of preparation tanks 8', 8", 8'''—three in the present case—are provided, which are individually and separately connectable to the backflush duct 6 as well as to the solvent supply duct 10 by means of valves 20, 21.

What I claim is:

1. A plant apparatus to be used in a cellulose acetate production process for filtering cellulose acetate spin solutions under backflushing, comprising
    a filtering station provided in a cellulose acetate duct and including at least one backflush filter having means to backflush said at least one backflush filter and a backflush duct means for transporting backflush liquid with insoluble solids away from said filtering station,
    feed means, including a plant for producing new spin solution, for supplying unfiltered cellulose acetate spin solution to said filtering station,
    a dilution station in communication with said backflush duct means for receiving said backflush liquid with said insoluble solids,
    a solvent supply means for feeding solvent into said dilution station for diluting said backflush liquid,
    a further means starting from said dilution station for transporting said diluted backflush liquid with said insoluble solids to a separator means,
    said separator means comprises means for separating insoluble solids from said diluted backflush liquid,
    a supply means starting at said separator means for supplying said backflush liquid freed from solids to said feed means.

2. A plant apparatus as set forth in claim 1, further comprising
    a drying station arranged to follow said separator for drying said separated insoluble solids and
    a solvent discharge duct starting from said drying station to supply solvent to said feed means.

3. A plant apparatus set forth in claim 1, wherein said dilution station comprises a plurality of containers connected in parallel and individually connectable to said backflush duct means.

4. A plant apparatus as set forth in claim 1, wherein said dilution station comprises a plurality of consecutively arranged containers.

* * * * *

UNITED STATES PATENT AND TRADEMARK OFFICE
CERTIFICATE OF CORRECTION

PATENT NO. : 5,330,642

DATED : July 19, 1994

INVENTOR(S) : Walter Klein

It is certified that error appears in the above-identified patent and that said Letters Patent is hereby corrected as shown below:

<u>TITLE PAGE</u>
In the heading "[30] Foreign Application Priority Data" for "[AU] Australia" please insert --[AT] Austria--.

Signed and Sealed this

Seventh Day of February, 1995

Attest:

BRUCE LEHMAN

Attesting Officer     Commissioner of Patents and Trademarks